Figure 1:
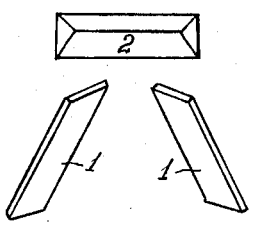
Figure 2:
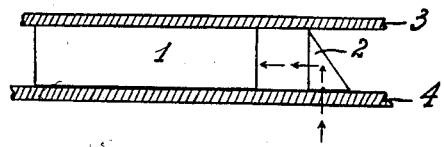
Figure 3:
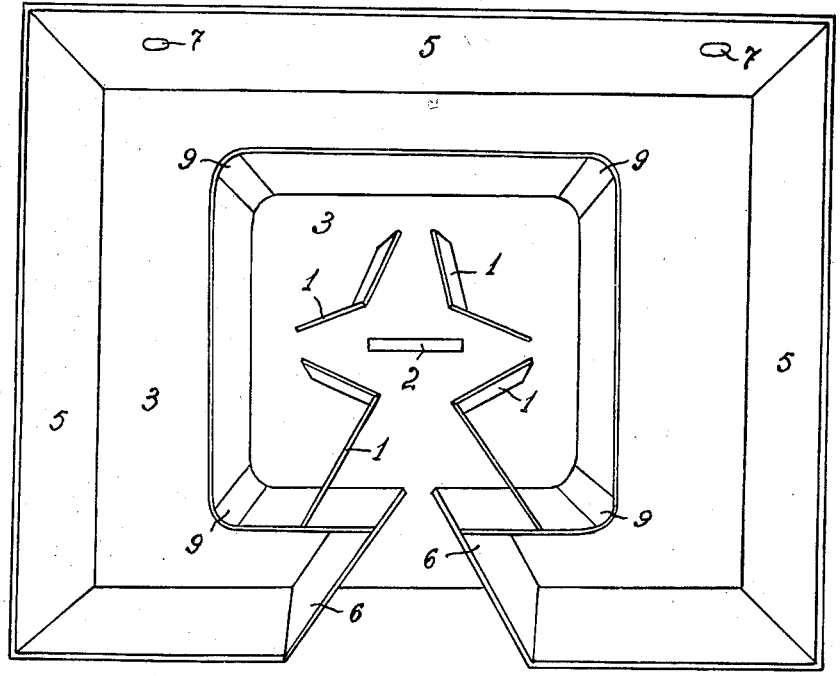
Figure 4:
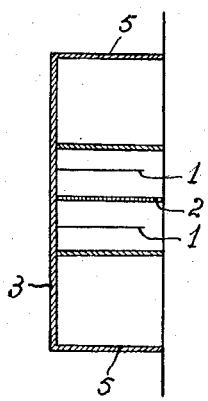
Figure 5:
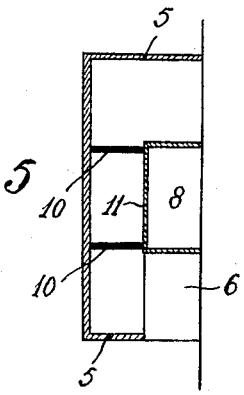

June 30, 1931. R. J. CARBALLO 1,812,512
INSECT TRAP
Filed Dec. 20, 1928

R. J. Carballo
INVENTOR
By Marks & Clerk
Attys.

Patented June 30, 1931

1,812,512

UNITED STATES PATENT OFFICE

RAUL JUAN CARBALLO, OF BUENOS AIRES, ARGENTINA

INSECT TRAP

Application filed December 20, 1928. Serial No. 327,443.

The present invention relates to a device for catching insects taking advantage of their habits to perch upon transparent, diaphanous or bright surfaces illuminated naturally or artificially, and the habit to fly in all directions when meeting with any obstacle in their way.

In view of this, the special device which consists in a kind of box which may be given all possible shapes with or without fixed or removable cover being in the latter case closed by the surface to which same is applied, is provided, at the level of said surface, with an entrance to its interior constituted by a small labyrinth which attracting and conveying the insects to its interior, renders difficult and tedious their way out of said labyrinth thus holding back a large percentage of those which entered and which are going to perish by inanition, a death that may be accelerated by means of solid or liquid insecticides being introduced or by means of a convenient spray of volatile insecticides.

The whole may be suspended, supported or fixed, depending upon whether surfaces are fixed or movable, vertical, horizontal or oblique, even or uneven or bent ones. This adaptability to any sort of surfaces—apart from the special labyrinth characteristics, lends to the whole of my system a peculiarity that renders it different to any trap system known, searches the insects when taking their walk, attracted by the light, on showroom glasses, doors, windows, mirrors, lamp shades or reflectors and generally upon any bright, transparent or diaphanous surface refracting or reflecting natural or artificial light.

The special labyrinth characteristics that make it easy for the insects to enter, but difficult and very troublesome to get out, are constituted by a series of partition walls of the same material throughout, straight or bent, plain or rounded, of sharp-angular shape arrangement, open at the summit so as to afford the animal the greatest possible separation for the entrance and the smallest possible separation for the way out; besides, in this extremity and at convenient distance is provided a small glass prism, mirror or an adequate surface which reflects the outer light towards the entrance increasing the attractiveness for the insect, but making it difficult for the latter to get out.

Said series of ducts which may be considered as channels in miniature and which form open angles at the summit with their reflector, are arranged in a labyrinth-like shape for which also loose partition-walls of different shaps and measurements are used constituting units of various forms, depending upon the dimensions and forms of the traps and which may be, as set forth, either plain or broken or bent, according to the surface intended for receiving the trap box.

For the greater clearness of the present specification and better comprehension of the invention, a drawing is annexed in which like reference numbers indicate like parts shown in the different figures.

Fig. I represents a duct or channel in miniature seen in horizontal projection.

Fig. II is the same elemental reproduction, on the whole, of Fig. I, however seen from the side, showing by arrows the reflection of the natural or artificial luminous rays.

Fig. III shows the front view of the complete trap and is internal distribution.

Fig. IV is the same trap as Fig. III, but shown in cross section.

Fig. V is a variation of Fig. IV.

In said drawings, 1 shows the partition walls and 2, the reflector. 3 represents the base plate section supporting both partition walls and reflector while 4 is the cover, if any, or else the surface on which the trap is resting. Said cover 4 and the supporting surface are to be transparent or at least diaphanous, except in case of a mirror or bright surface when plate base 3 will have to be transparent or diaphanous and the position of the reflector reversed. Plate base 3 carries a frame 5 of variable height which constitutes the supporting frame of the box which in the lower front side is provided with the rods or partition walls 6 conveying the insect to the entrance of the labyrinth as may be seen from Fig. III formed by both partition walls 1 and reflector 2, in accordance with the indication above set forth, the whole of which, as may be seen, may be of different forms depending upon the conditions of surface intended for receiving the trap.

The whole of this labyrinth 8 has a height or depth which may be equal to or smaller than that of the trap, in which latter case (Fig. V) same is secured to plate base 3 by means of supports 10 carrying at their ends a closure 11 for the labyrinth 8 thus making independent the ambient of the labyrinth from that of the trap which communicates by outlets 9 with the labyrinth.

Frame 5 is provided with small outlets 7 which besides giving the trap a little ventilation, serve to permit spraying, by means of tubes or syringes, the insecticide which it may be desired to use, either solid or liquid or gaseous.

In the trap type made out of cellophane or similar light-weight material which will be described later on, this system is abbreviated by the trap being stuck on to the glass or the surface by an appropriate adhesive means.

In the event of the trap being positioned on fixed vertical surfaces, glass for instance, etc., the device may be simply suspended just as if same were a picture.

In case of horizontal surfaces, the trap will, by its own weight, remain fixed in due form, the same applies to bent surfaces such as lamp shades or illuminating reflectors in general in which case the trap adopts the shape of the surface forming a kind of mantle.

The trap may be made out of glass, earthenware, porcelain, celluloid, cellophane, gelatine, tin-plate or enamelled wood and generally out of any class of material, and in accordance with the type of material used, the trap types made out of material easily to be washed, may be classified in two categories, viz. those of unlimited use such as glass, earthenware, tin plate etc.; in order to facilitate the operation, borders and angles may be made round, and those of limited use, viz. made out of pasteboard and cellophane or paper, the principal type of which I am going to describe as follows: within a frame of pasteboard or wood, lined at both sides with cellophane or transparent paper, the described labyrinth is formed out of the same material, and from the start, inside a determined quantity of any powdered insecticide is sprayed to be preserved until used, by a firm closure to be completed by a gummed paper covering the entrance to the labyrinth and to be removed when using the insect powder. This trap, very economical, but of limited duration, may be simply stuck by glue on to the surface of the door glasses, window glasses etc. and be destroyed by fire no cleaning being required in opposition to the trap type, being very convenient for sanitary establishments and hospitals, especially in cases of infectious diseases.

Working is the following:

The traps are positioned, in the manner already described, on transparent, diaphanous or bright, even or bent or broken surfaces reflecting or refracting natural or artificial light such as through door, window, shop, lamp shade and illuminating reflector glasses etc. opposite to the side the light is coming from or at the same side. In the case of mirrors or bright surfaces, after giving the light time to develop the inside of the trap is sprayed every now and then with solid, liquid or gaseous insecticides, care should be taken to see that the trap fits close to the supporting surface and that it is cleaned every now and then. To the latter effect, it is necessary to use insecticides of rapid action except for traps with cover which may be withdrawn and dipped into water.

As the front sides of the trap need not be absolutely transparent, same may be used for advertisement matter and propaganda purposes when used in sale rooms, legends in offices and designs, pictures, allegories etc. in private rooms, all of which may be complemented at the lower part with ornamental and fringe borders.

What I claim is the following:

An insect trap of the character described, comprising a main housing provided with an inlet, a secondary trapping box arranged within the main housing and also provided with an inlet of considerably smaller size than the inlet of the main housing, partition walls between the box and the housing and cooperating with the openings to form a converging entrance, a prism within the box opposite the inlet opening, angularly disposed and spaced reflecting partitions within the box and on opposite sides of the prism, the space between the housing and the box constituting an insecticide receiving chamber, and the inner box being provided with openings permitting insects to pass from the box to the insecticide chamber.

In testimony whereof I affix my signature.

RAUL JUAN CARBALLO.